(12) United States Patent
Leggett et al.

(10) Patent No.: US 10,370,832 B2
(45) Date of Patent: Aug. 6, 2019

(54) HYDRANT ASSEMBLY

(71) Applicants: John Albert Leggett, Burks Falls (CA); Kyle William Jenkins, Burks Falls (CA)

(72) Inventors: John Albert Leggett, Burks Falls (CA); Kyle William Jenkins, Burks Falls (CA)

( * ) Notice: Subject to any disclaimer, the term of this patent is extended or adjusted under 35 U.S.C. 154(b) by 0 days.

(21) Appl. No.: 15/530,806

(22) Filed: Mar. 3, 2017

(65) Prior Publication Data

US 2018/0230682 A1 Aug. 16, 2018

(30) Foreign Application Priority Data

Feb. 10, 2017 (CA) ...................................... 2957858

(51) Int. Cl.
*E03B 9/04* (2006.01)
*E03B 3/12* (2006.01)
(Continued)

(52) U.S. Cl.
CPC .................. *E03B 9/04* (2013.01); *E03B 3/12* (2013.01); *E03B 3/16* (2013.01); *E03B 9/025* (2013.01); *Y02A 20/116* (2018.01)

(58) Field of Classification Search
CPC ..... E03B 9/04; E03B 3/01; E03B 3/15; E03B 9/025; Y10T 137/6014
See application file for complete search history.

(56) References Cited

U.S. PATENT DOCUMENTS

| 753,349 | A | 3/1904 | Bacon |
|---|---|---|---|
| 1,172,959 | A | 2/1916 | Dormon |

(Continued)

FOREIGN PATENT DOCUMENTS

| CA | ID24053 | 5/1961 |
|---|---|---|
| CA | ID27052 | 3/1965 |

(Continued)

OTHER PUBLICATIONS

Goggle—Freeflow underground hydrant, height-adjustable, http://www.hawte.at/EN/PRODUCTS/WATER/DETAILS/GM200039-FREEFLOW-UNDERGROUND-HYDRANT-HEIGHT-ADJUSTABLE.HTML; believed to have been publically available at least as early as Jan. 2012.

*Primary Examiner* — Eric Keasel
*Assistant Examiner* — Kevin R Barss

(57) ABSTRACT

An apparatus includes a hydrant assembly 102 configured for use with a well casing 900, a pitless adapter 902, and a pump assembly 904. The hydrant assembly 102 includes a water spout assembly 104 configured to be positioned above the ground 906 and also above the well casing 900. A water pipe assembly 106 is configured to be in fluid communication with the pitless adapter 902, the pump assembly 904 and the water spout assembly 104. This is done in such a way that water flows from the pump assembly 904, past the pitless adapter 902 and toward the water spout assembly 104 once the pump assembly 904 is activated. A pipe-support assembly 108 is configured to be positioned relative to the well casing 900, the pitless adapter 902 and the pump assembly 904. The pipe-support assembly 108 is also configured to selectively spatially position and support, at least in part, the water pipe assembly 106 relative to the well casing 900, the pitless adapter 902 and the pump assembly 904 in such a way that the pipe-support assembly 108, in use, provides selective spatial positioning of the water pipe assembly 106 relative to site-installation conditions associated with the well casing 900, the pitless adapter 902 and the pump assembly 904, which are installed relative to the surface 905 of the ground 906.

18 Claims, 9 Drawing Sheets

(51) Int. Cl.
*E03B 3/16* (2006.01)
*E03B 9/02* (2006.01)

(56) References Cited

U.S. PATENT DOCUMENTS

| | | | |
|---|---|---|---|
| 1,200,691 A | 10/1916 | Mabe et al. | |
| 1,561,736 A | 11/1925 | Menige | |
| 2,099,928 A | 11/1937 | Doppelhammer | |
| 2,244,993 A | 6/1941 | Hollifield, Jr. | |
| 2,829,597 A | 4/1958 | Patterson | |
| 2,859,823 A * | 11/1958 | Bauer | E21B 33/02 166/85.2 |
| 3,380,533 A | 4/1968 | Andrew | |
| D224,605 S | 8/1972 | Ratnik | |
| D226,482 S | 3/1973 | Uroshevich | |
| 3,738,390 A | 6/1973 | Luckenbill | |
| 3,770,003 A | 11/1973 | Uroshevich | |
| 3,858,599 A | 1/1975 | Carlson | |
| 3,875,698 A * | 4/1975 | Clark | E03B 5/04 417/38 |
| 3,914,966 A | 10/1975 | Bello | |
| 4,280,525 A | 7/1981 | Byrnes | |
| 4,531,664 A | 7/1985 | Baski | |
| D282,099 S | 1/1986 | Tropeano | |
| 4,653,522 A | 3/1987 | Fillman et al. | |
| 4,741,356 A | 5/1988 | Letzo et al. | |
| 4,757,641 A | 7/1988 | Penrod | |
| 5,099,565 A | 3/1992 | Campbell | |
| 5,439,052 A * | 8/1995 | Skinner | E21B 33/00 137/625.46 |
| 5,697,393 A | 12/1997 | Mirlisena, Sr. | |
| 5,979,490 A | 11/1999 | Mirlisena, Sr. | |
| 6,047,723 A | 4/2000 | Hoeptner | |
| 6,684,900 B1 | 2/2004 | McKeauge | |
| 6,899,120 B1 | 5/2005 | Motley | |
| 8,413,675 B2 | 4/2013 | Cantrell | |
| 8,844,558 B2 | 9/2014 | Ball et al. | |
| 8,851,104 B2 | 10/2014 | One | |
| 2007/0163653 A1 | 7/2007 | Gomo | |
| 2011/0186145 A1 | 8/2011 | Cantrell | |
| 2015/0001429 A1 | 1/2015 | Ball et al. | |

FOREIGN PATENT DOCUMENTS

| | | |
|---|---|---|
| CA | ID28760 | 10/1966 |
| CA | ID30074 | 12/1967 |
| CA | ID30383 | 3/1968 |
| CA | ID32909 | 9/1970 |
| CA | ID33545 | 2/1971 |
| CA | ID34814 | 12/1971 |
| CA | ID38163 | 10/1974 |
| CA | 2513961 | 2/2006 |
| CA | ID130524 | 2/2010 |
| EP | 545840 | 9/1993 |
| EP | 717156 | 6/1996 |
| EP | 791695 | 8/1997 |
| WO | WO2016/114735 | 7/2016 |

* cited by examiner

HYDRANT ASSEMBLY

TECHNICAL FIELD

This document relates to the technical field of (and is not limited to) hydrant assemblies (and methods associated therewith).

BACKGROUND

A hydrant includes an outlet from a fluid main often including a pipe with a valve attached from which a fluid (such as, potable water) can be tapped.

SUMMARY

It will be appreciated that there exists a need to mitigate (at least in part) at least one problem associated with the existing hydrant assemblies (also called the existing technology). After much study of the known systems and methods with experimentation, an understanding of the problem and its solution has been identified and is articulated as follows:

Existing hydrants are not suited for a well casing 900 having a pitless adapter 902 and a pump assembly 904 installed therein. The existing hydrants do not easily accommodate fluid installation between a water spout assembly 104 and a water pipe assembly 106 with the pitless adapter 902 and the pump assembly 904.

To mitigate, at least in part, at least one problem associated with the existing technology, there is provided (in accordance with a major aspect) an apparatus. The apparatus includes a hydrant assembly 102 configured for use with a well casing 900, a pitless adapter 902, and a pump assembly 904. The well casing 900 is configured to be positioned in, at least in part, and extend into, at least in part, the ground 906 in such a way that the well casing 900 extends from above the ground 906 to below the ground 906 and terminates at a water supply 901 positioned in the well casing 900. The pitless adapter 902 is positioned inside the well casing 900 and below the ground 906. The pump assembly 904 is positioned inside the well casing 900, and is also positioned below the pitless adapter 902, and is also positioned relative to the water supply 901. The hydrant assembly 102 includes a water spout assembly 104 configured to be positioned above the ground 906 and also above the well casing 900. A water pipe assembly 106 is configured to be in fluid communication with the pitless adapter 902, the submersible pump 904 and the water spout assembly 104. This is done in such a way that water flows from the submersible pump 904, past the pitless adapter 902 and toward the water spout assembly 104 once the submersible pump 904 is activated. A pipe-support assembly 108 is configured to be positioned relative to the well casing 900, the pitless adapter 902 and the submersible pump 904. The pipe-support assembly 108 is also configured to selectively spatially position and support, at least in part, the water pipe assembly 106 relative to the well casing 900, the pitless adapter 902 and the pump assembly 904 in such a way that the pipe-support assembly 108, in use, provides selective spatial positioning of the water pipe assembly 106 relative to site-installation conditions associated with the well casing 900, the pitless adapter 902 and the pump assembly 904, which are installed relative to the surface 905 of the ground 906.

In accordance with an option, the pitless adapter 902 is positioned relative to the surface 905 of the ground 906 as a result of site specific conditions associated with an installation site of the hydrant assembly 102. The hydrant assembly 102, in use, remains in a fixed position relative to the surface 905 of the ground 906 once the hydrant assembly 102 is installed in the installation site, in which a variable depth 912 is a depth of the pitless adapter 902 below the surface 905 of the ground 906, and the variable depth 912 is an installation-dependent variable.

Other aspects are identified in the claims. Other aspects and features of the nonlimiting embodiments may now become apparent to those skilled in the art upon review of the following detailed description of the nonlimiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

DETAILED DESCRIPTION OF THE DRAWINGS

The nonlimiting embodiments may be more fully appreciated by reference to the following detailed description of the nonlimiting embodiments when taken in conjunction with the accompanying drawings, in which.

Figure 2:
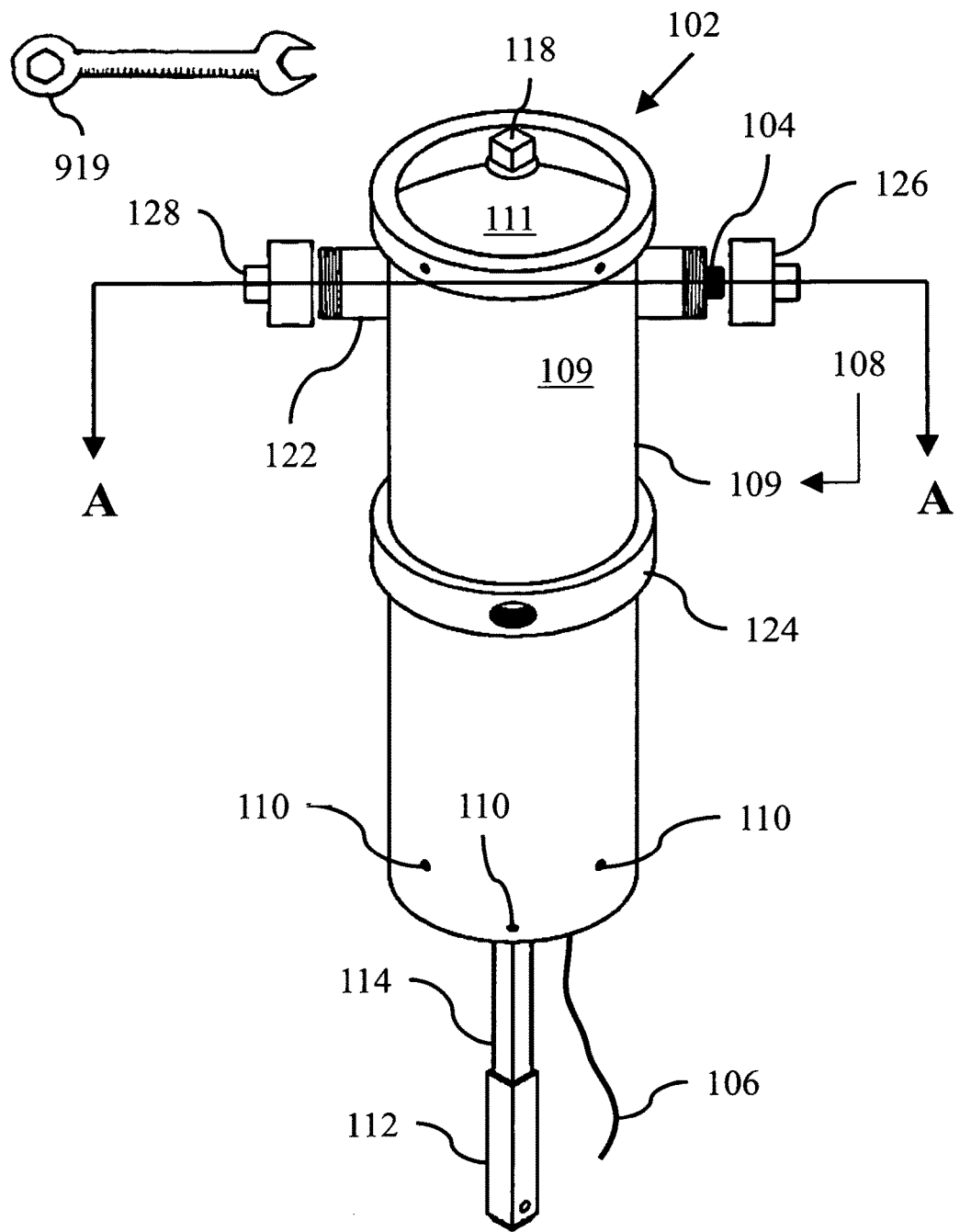
FIG. 2 (SHEET 2 OF 9 SHEETS) depicts a perspective view of a first embodiment of a hydrant assembly 102 configured for use with the well casing 900 of FIG. 1.
Figure 9:
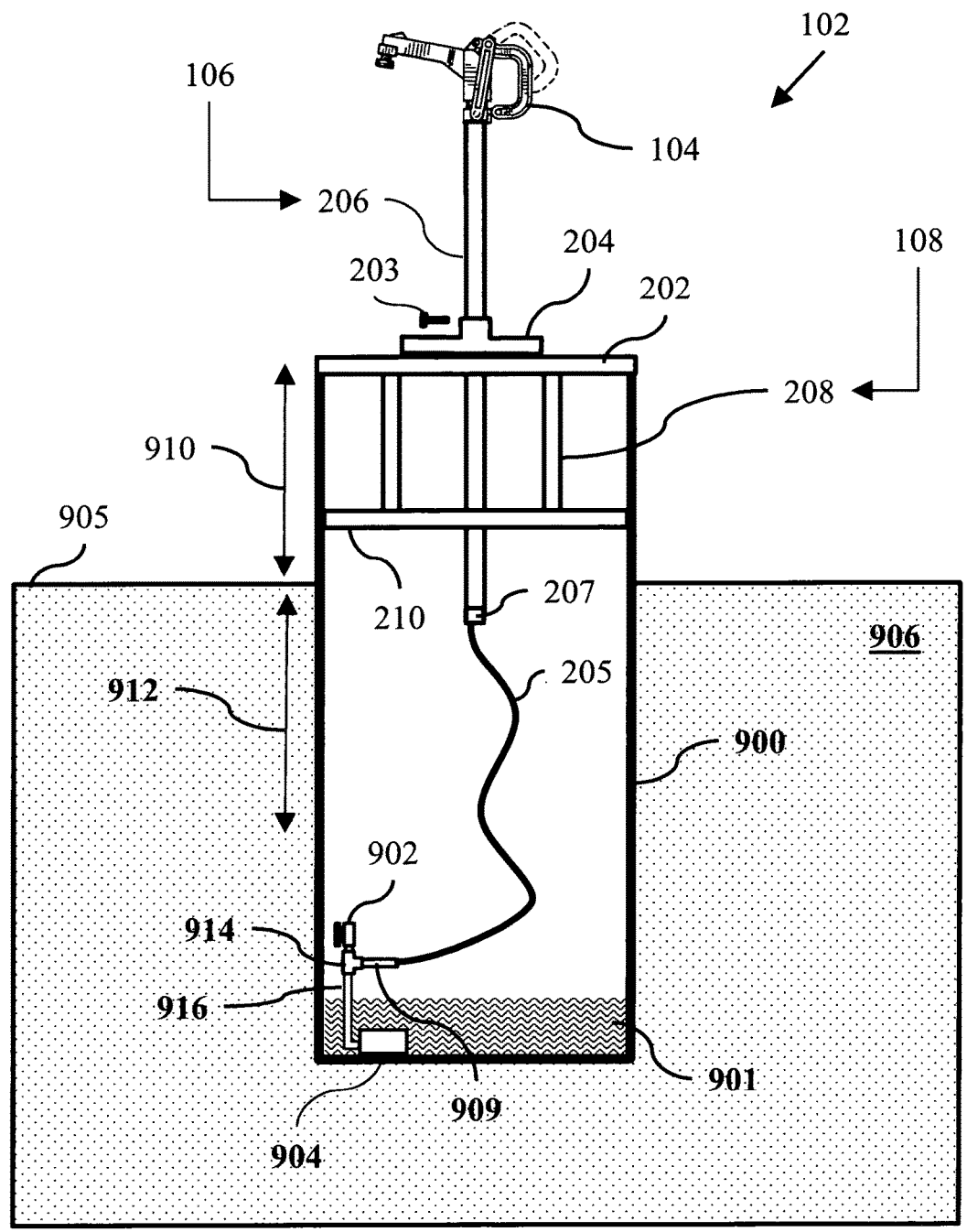
Figure 10:
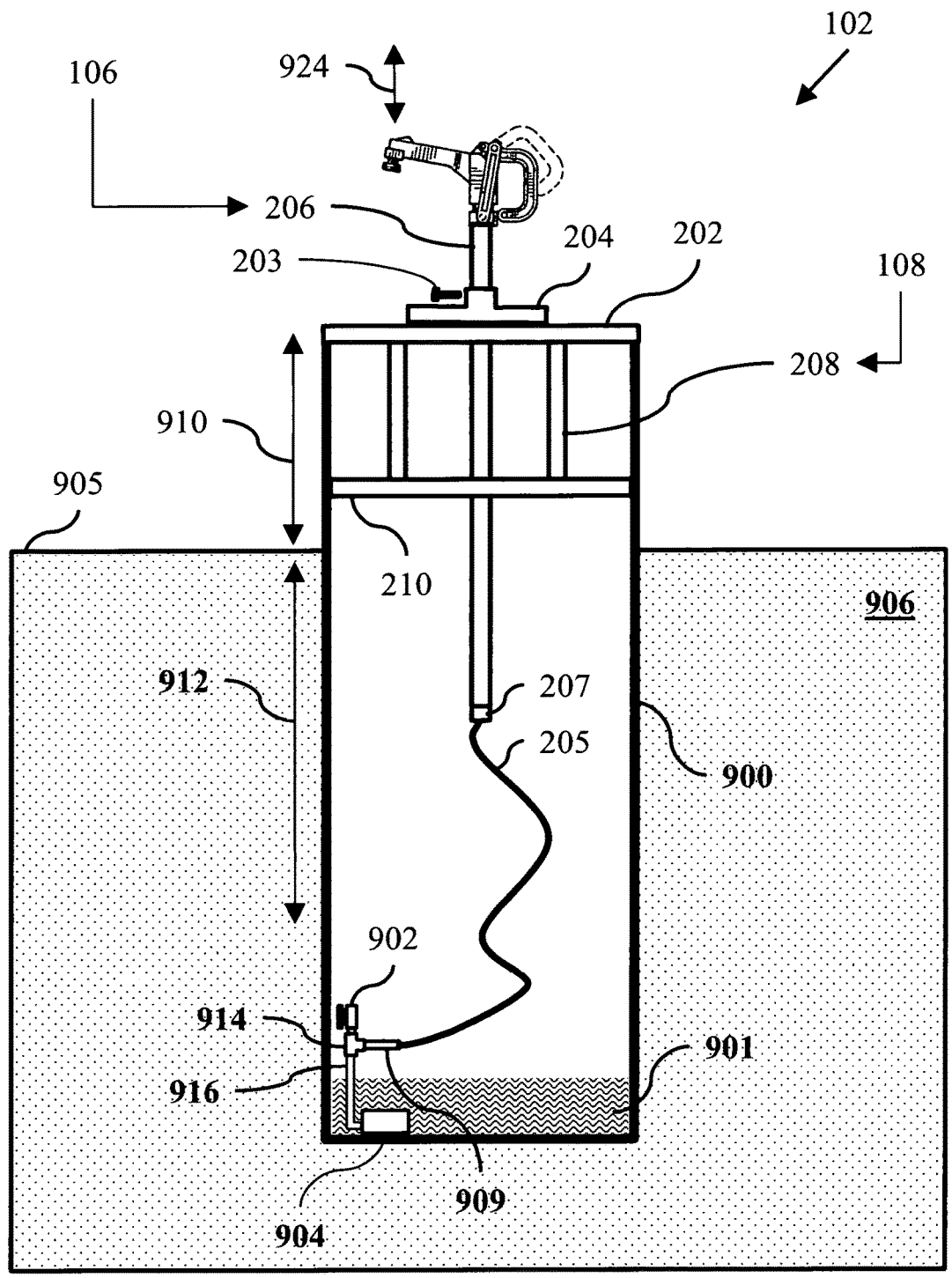

FIG. 9 (SHEET 8 OF 9 SHEETS) depicts a side view of the second embodiment of the hydrant assembly 102 of FIG. 2, in which the hydrant assembly 102 is installed at a third installation site; and FIG. 10 (SHEET 9 OF 9 SHEETS) depicts a side view of the second embodiment of the hydrant assembly 102 of FIG. 2, in which the hydrant assembly 102 is installed at a fourth installation site.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 hydrant assembly
104 water spout assembly
106 water pipe assembly
108 pipe-support assembly
109 elongated cylindrical-shaped housing
110 connector assembly
111 lid assembly
112 first elongated portion
114 second portion
116 mount assembly
118 flow control handle
120 handle retainer
122 blind spout
124 collar assembly
126 spout cap
128 blind cap
202 well cap assembly
203 pipe connector
204 collar assembly
205 flexible pipe assembly
206 elongated rigid pipe
207 bleed valve
208 spacer assembly
210 spacing assembly
211 notch
900 well casing
901 water supply
902 pitless adapter
904 pump assembly
905 surface
906 ground
908 house
909 water line
910 fixed height
911 extension water line
912 variable depth
914 fluid connection
916 extension water line
918 flow control valve
919 tool
920 rotation direction
922 linear direction
924 height difference

DETAILED DESCRIPTION OF THE NONLIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of may be defined by the claims (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 1:
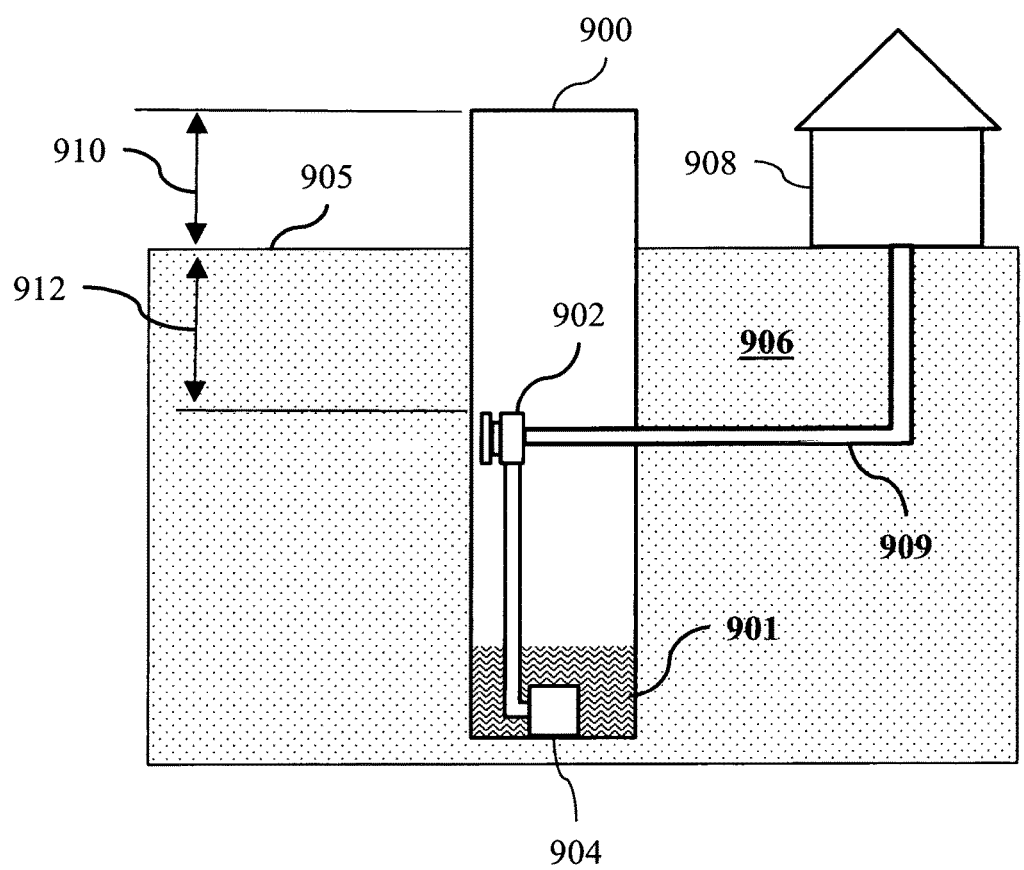
FIG. 1 (SHEET 1 OF 9 SHEETS) depicts a side view of an embodiment of a well casing 900.

FIG. 1 depicts a side view of an embodiment of a well casing 900.

In accordance with what is depicted in FIG. 1, a house 908 is positioned and located relative to the buried section of the well casing 900 that is installed (at least in part) in the ground 906. A water line 909 extends from the well casing 900 to the house 908. Preferably, the water line 909 includes an elongated portion that extends substantially horizontally through the ground 906 (toward the house 908). The water line 909 is configured to convey (under pressure) potable water from the well casing 900 to the house 908. Preferably, the water line 909 extends, at least in part, through (below) the ground 906 from the well casing 900 to the house 908.

Preferably, the well casing 900 forms an elongated hollow tubular body, a shaft or a tubular lining that is made of concrete or steel or any equivalent thereof. The well casing 900 is also called a water well. The well casing 900 is positioned and installed, at least in part, in the well shaft (a hole) formed by (surrounded by) the ground 906. The well casing 900 is inserted into the well shaft that is formed in the ground 906. In addition, the well casing 900 provides stability for the well shaft that is formed in the ground 906. The well casing 900 is inserted in the ground 906 by digging, driving, boring, or drilling to access the groundwater (such as, the water supply 901) in an underground aquifer (known and not depicted).

An exposed length of the well casing 900 extends above the surface 905 of the ground 906. The top edge of the well casing 900 is positioned at a fixed height 910 (fixed length) located above (vertically above) the surface 905 of the ground 906, such as eighteen (18) inches, etc. (as required by local construction and building regulations). It is standard procedure to install the well casing 900 (at least in part) into the ground 906, at an installation site. Preferably, the fixed height 910 does not vary from one installation site to another installation site on account of the local construction and building regulations. This is done in such a way that the well casing 900 extends (at least in part) above the surface 905 of the ground 906 by a fixed height 910 (or height, which remains the same for each installation site) that meets the requirements of the local construction and/or building regulations (also called the building code).

A pump assembly 904 is positioned relative to the water supply 901, which is located in the bottom section of the well casing 900. The water supply 901 is drawn by the pump assembly 904. Preferably, the pump assembly 904 includes a submersible pump that is positioned in the water supply 901. This is done in such a way that the pump assembly 904 is submerged (at least in part) in the water supply 901 to be pumped (removed from the well casing 900). Generally, the pump assembly 904 is lowered down the well casing 900, and is used for extracting potable water from the interior of the well casing 900.

A pitless adapter 902 is positioned and installed in the interior of the well casing 900 below the surface 905 of the ground 906. Preferably, the pitless adapter 902 is installed above the pump assembly 904, at a variable depth 912 relative to the surface 905 of the ground 906. The variable depth 912 is installation dependent (and which varies from installation site to installation site). The variable depth 912 accounts for the depth of the frost line for a specific installation site. The variable depth 912 may represent the frost line for a particular installation. The pitless adapter 902 is installed below the frost line in the well casing 900 for a specific installation site (in order to avoid unwanted freezing of the pitless adapter 902). The pitless adapter 902 is fluidly connected to the water line 909 in such a way that the water line 909, in use, conveys potable water from the pump assembly 904 to the pitless adapter 902 and then to the house 908.

It will be appreciated that the overall length (vertical height) of the well casing 900 is variable, and the length thereof is dependent on the site conditions for the installation of the well casing 900. Therefore, the vertical depth of the pitless adapter 902 may vary from installation site to installation site, depending on site conditions. The position of the pitless adapter 902 is configured to keep the pumped water above the freezing temperature (to prevent the potable water from inadvertently freezing during winter months or colder times of the year) once the pitless adapter 902 is positioned below the freezing point or the frost line (within the ground 906). The pitless adapter 902 is also configured to provide service access to the pump assembly 904 and the associated equipment. The pitless adapter 902 is configured to seal (in use) the passage cut into the well casing 900, and to fluidly connect (in use) the water line 909, which conveys (carries) the potable water from the interior of the well casing 900 to the house 908. When removing the pump assembly 904, the point of disconnection is the pitless adapter 902. Placement of the pitless adapter 902 relative to the surface 905 of the ground 906 depends on the depth of the frost line associated with a particular installation, which varies by the climatic region (for a particular installation of the well casing 900), for instance from a depth of about seven (7) feet to about eight (8) feet for relatively colder climates, and a depth of about two (2) feet to about three (3) feet for relatively milder climates. The pitless adapter 902 may include components made of brass, etc.

In summary (and in accordance with FIG. 1), the well casing 900 is configured to be positioned in, at least in part, and extend into, at least in part, the ground 906. This is done in such a way that the well casing 900 extends from above the ground 906 to below the ground 906, and terminates at the water supply 901. The water supply 901 is positioned in (positioned at the bottom section of) the well casing 900. The pitless adapter 902 is positioned inside the well casing 900 and below the top surface of the ground 906. The pump assembly 904 is positioned inside the well casing 900, and is also positioned below the pitless adapter 902, and is also positioned relative to (preferably, within) the water supply 901.

FIG. 2 depicts a perspective view of a first embodiment of a hydrant assembly 102 configured for use with the well casing 900 of FIG. 1.

Figure 3:
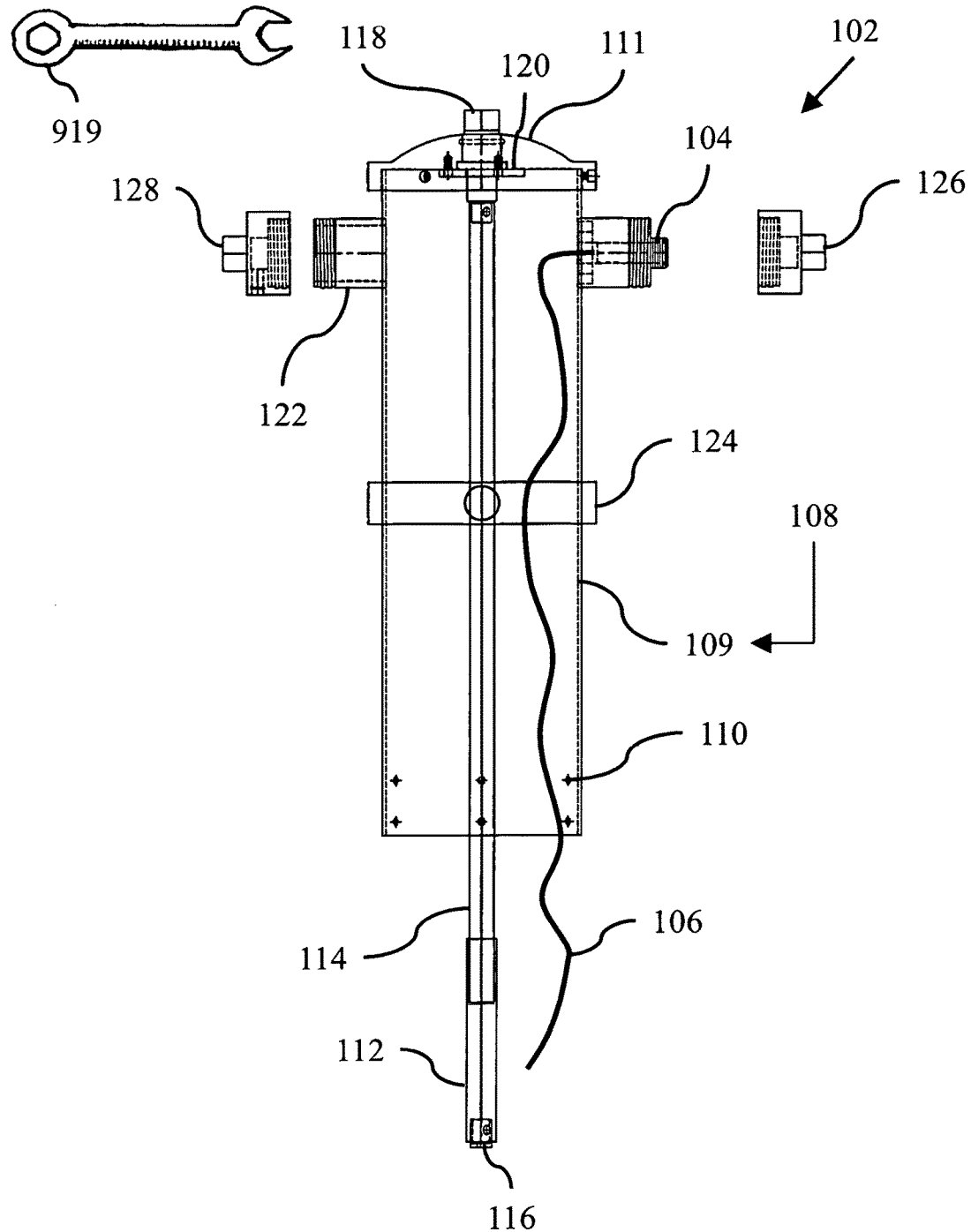
FIG. 3 (SHEET 3 OF 9 SHEETS) depicts a cross-sectional side view of the first embodiment of the hydrant assembly 102 of FIG. 2, which is taken along cross-sectional line A-A, as depicted in FIG. 2.

FIG. 3 depicts a cross-sectional side view of the first embodiment of the hydrant assembly 102 of FIG. 2, which is taken along cross-sectional line A-A, as depicted in FIG. 2.

In accordance with a major embodiment of the hydrant assembly 102 (as depicted in FIGS. 2 to 10), which is also applicable to the first embodiment (as depicted in FIGS. 2 to 6) and the second embodiment (as depicted in FIGS. 7 to 10) of the hydrant assembly 102, the hydrant assembly 102 is configured for use with the well casing 900, the pitless adapter 902, and the pump assembly 904 (of which are all depicted in FIG. 1).

The hydrant assembly 102 includes (and is not limited to) a synergistic combination of a water spout assembly 104, a water pipe assembly 106, and a pipe-support assembly 108.

The water spout assembly 104 is configured to be positioned above the ground 906, and also positioned above the well casing 900 (for convenient access by the user). The water spout assembly 104 may include a standard water hose connection mechanism, and any equivalent thereof, for fluid communication with a water hose, or a sprinkler system, and any equivalent thereof. Preferably, the water spout assembly 104 includes brass fittings, and any equivalent thereof.

The water pipe assembly 106 is configured to be in fluid communication with the pitless adapter 902, the pump assembly 904 and the water spout assembly 104. This is done in such a way that the potable water flows from the pump assembly 904, past the pitless adapter 902 and toward the water spout assembly 104 once the pump assembly 904 is activated (to pump or move the water from the interior of the well casing 900). Generally, the water pipe assembly 106 includes any type of suitable material, such as plastic or metal and any equivalent thereof. In accordance with a preferred embodiment, the water pipe assembly 106 includes a flexible water line, such as a flexible polyethylene water line (and any equivalent thereof).

Generally, the pipe-support assembly 108 is configured to be positioned relative to the well casing 900, the pitless adapter 902 and the pump assembly 904. The pipe-support assembly 108 is also configured to selectively spatially position and support, at least in part, the water pipe assembly 106 relative to the well casing 900, the pitless adapter 902 and the pump assembly 904 in such a way that the pipe-support assembly 108, in use, provides selective spatial positioning of the water pipe assembly 106 relative to site-installation conditions associated with the well casing 900, the pitless adapter 902 and the pump assembly 904, which are installed relative to the surface 905 of the ground 906. It will be appreciated that the pipe-support assembly 108 may include steel components or plastic components having a UV protectant embedded therein, and any equivalent thereof.

In accordance with the embodiments as depicted in FIG. 2 and FIG. 3, the hydrant assembly 102 further includes a connector assembly 110 configured to selectively securely connect (either directly or indirectly) the pipe-support assembly 108 to an exposed end section of the well casing 900, in which the exposed end section extends above the ground 906. The connector assembly 110 includes a bolt and any equivalent thereof.

In accordance with the embodiments as depicted in FIG. 2 and FIG. 3, the pipe-support assembly 108 is configured to (preferably) mimic or resemble a fire hydrant (such as of the type installed along a municipal road of a housing subdivision, etc.). The pipe-support assembly 108 includes an elongated cylindrical-shaped housing 109 forming (providing) a peripheral outer surface. The pipe-support assembly 108 further includes a lid assembly 111 (also called a cover assembly). The lid assembly 111 is configured to be securely connected (selectively coupled) to a top section (a distal section) of the elongated cylindrical-shaped housing 109.

Generally, the pipe-support assembly 108 is configured to securely support the water spout assembly 104. Preferably, the pipe-support assembly 108 is configured to securely support the water spout assembly 104 on the peripheral outer surface of the elongated cylindrical-shaped housing 109. More preferably, the pipe-support assembly 108 is configured to securely support the water spout assembly 104 on the peripheral outer surface of the elongated cylindrical-shaped housing 109 in such a way that the pipe-support assembly 108, in use, securely supports the water spout assembly 104 at a location that is proximate to the lid assembly 111 once the lid assembly 111 is securely connected to the top section of the elongated cylindrical-shaped housing 109. The water spout assembly 104 is configured to be fluidly connected to the water pipe assembly 106 (by using water-tight fittings, known and not depicted).

In accordance with a preferred option, a spout cap 126 is configured to be selectively securely attachable to (and detachable from) the water spout assembly 104 (preferably, with corresponding matted threaded structures and any equivalent thereof). The spout cap 126 is configured to cover the water spout assembly 104 once the spout cap 126 is selectively securely attached to the water spout assembly 104.

Preferably, the pipe-support assembly 108 is configured to securely support a blind spout 122. More preferably, the pipe-support assembly 108 is configured to securely support a blind spout 122 on the peripheral outer surface of the elongated cylindrical-shaped housing 109, and proximate to the lid assembly 111, once the lid assembly 111 is securely connected to the top section of the elongated cylindrical-shaped housing 109. The blind spout 122 does not convey potable water, and is not fluidly connected to the water pipe assembly 106. The blind spout 122 is positioned and located on the elongated cylindrical-shaped housing 109 (opposite of the water spout assembly 104). Preferably, a blind cap 128 is configured to be selectively securely attachable to (and securely detachable from) the blind spout 122 (preferably, with corresponding matted threaded structures and any equivalent thereof).

A flow control handle 118 is configured to be operatively mounted to the central zone of the lid assembly 111. This is done in such a way that the flow control handle 118 is operatively supported by the lid assembly 111 (so that the flow control handle 118 is rotatable and is linearly translatable). The flow control handle 118 is configured to interface with a tool 919. The lid assembly 111 is configured to permit the flow control handle 118 to be rotated about a vertically-aligned elongated axis that extends through the flow control handle 118 along the vertical direction through the elongated cylindrical-shaped housing 109. The lid assembly 111 is also configured to permit the flow control handle 118 to be linearly translated along the vertical direction (upwardly and downwardly) in response to the rotation of the flow control handle 118 (preferably, by rotation via the tool 919 and any equivalent thereof).

More specifically, a handle retainer 120 is configured to operatively retain (couple) the flow control handle 118 to the lid assembly 111. The handle retainer 120 is configured to permit the flow control handle 118 to be rotated about a vertically-aligned axis that extends through the flow control handle 118 along the vertical direction through the elongated cylindrical-shaped housing 109. The handle retainer 120 is configured to permit the flow control handle 118 to be linearly translated along the vertical direction (upwardly and downwardly) in response to the rotation of the flow control handle 118 (preferably, by rotation via the tool 919). Preferably, the handle retainer 120 and the flow control handle 118 are threadably interfaced (coupled) to each other. The handle retainer 120 is configured to be affixed to the interior section of the lid assembly 111.

In accordance with a preferred embodiment, the flow control handle 118 includes a first elongated portion 112 (also called a bottom sleeve) and a second portion 114 (also called a top sleeve). The second portion 114 is configured to be affixed to the bottom portion of the flow control handle 118, and extends downwardly from the flow control handle 118. The first elongated portion 112 and the second portion 114 are coaxially aligned with each other, and are also coaxially movable relative to each other. The first elongated portion 112 is configured to slidably receive (slidably interact with) the second portion 114. The first elongated portion 112 is configured to be selectively connectable to (and disconnectable from) the second portion 114 (once the overall length or vertical height of the first elongated portion 112 and the second portion 114 is determined and set as described below in connection with FIGS. 5 and 6).

The flow control handle 118 is configured to be rotated along the vertically-aligned longitudinal axis extending through the first elongated portion 112 and the second portion 114 (once the first elongated portion 112 and the second portion 114 are coaxially aligned with each other).

The flow control handle 118 is configured to be selectively linearly translated upwardly and downwardly along the vertically-aligned longitudinal axis extending through the flow control handle 118 once the flow control handle 118 is selectively rotated (either clockwise or counterclockwise). The tool 919 (and any equivalent thereof) may be utilized to rotate the flow control handle 118.

In accordance with the embodiments as depicted in FIG. 2 and FIG. 3, the pipe-support assembly 108 further includes a collar assembly 124 (also called a ring structure). The collar assembly 124 is configured to be securely positioned about midway between the top section and the bottom section of the elongated cylindrical-shaped housing 109 of the pipe-support assembly 108. The collar assembly 124 is configured to house (contain) a pump control device (known and not depicted), which is configured to control the operation of the pump assembly 904 and/or to provide electrical power to the pump assembly 904.

Figure 4:
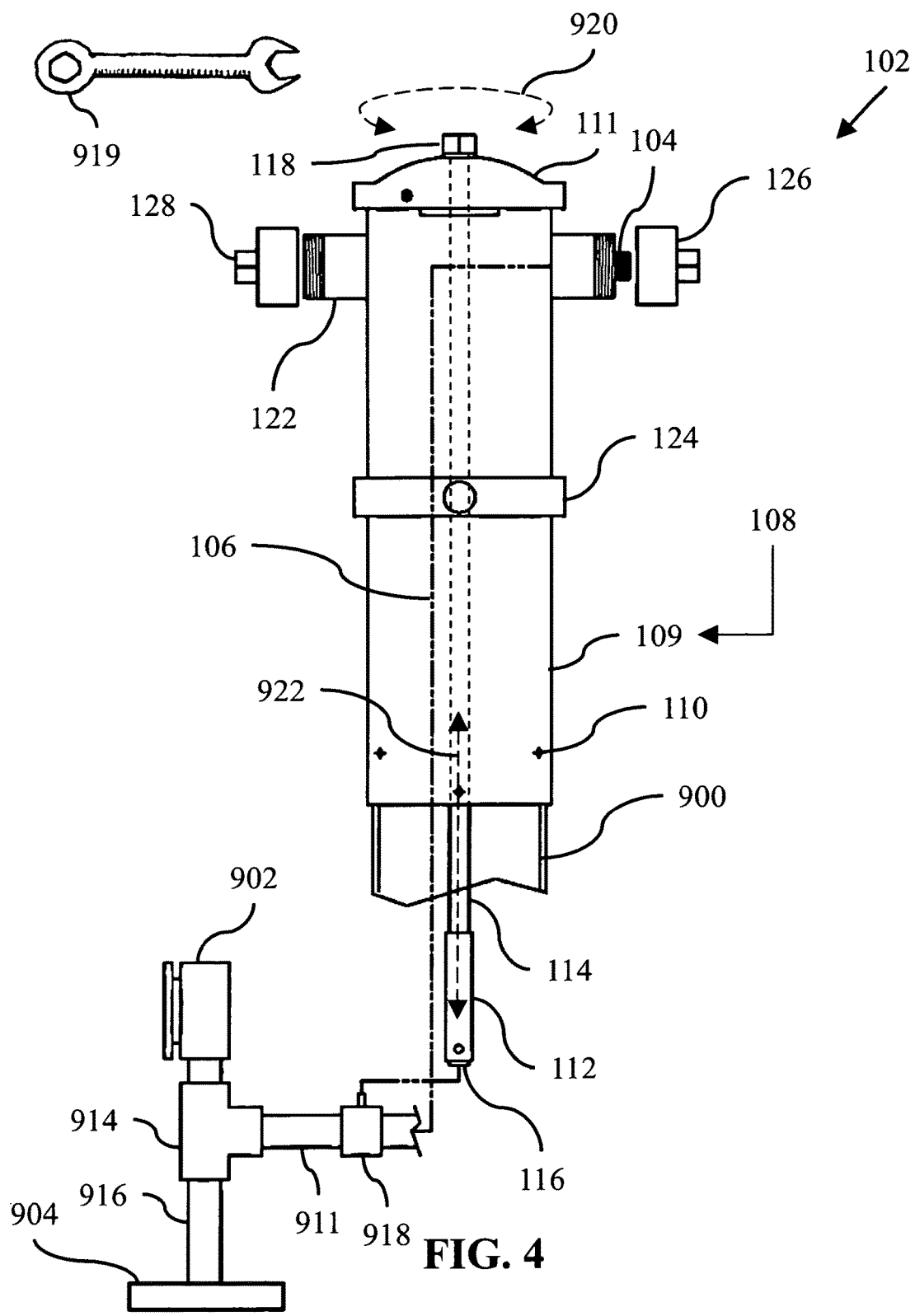
FIG. 4 (SHEET 4 OF 9 SHEETS) depicts a side view of the first embodiment of the hydrant assembly 102 of FIG. 2.

In accordance with the embodiments as depicted in FIG. 3, the first elongated portion 112 includes a distal portion having a mount assembly 116 operatively positioned on the distal portion of the first elongated portion 112. FIG. 4 depicts the purpose of the mount assembly 116.

FIG. 4 depicts a side view of the first embodiment of the hydrant assembly 102 of FIG. 2.

In accordance with the embodiment as depicted in FIG. 4, the first elongated portion 112 includes the mount assembly 116 that is configured to connect or contact a flow control valve 918 that is positioned in the interior of the well casing 900. The flow control valve 918 is configured to be in fluid communication with the water pipe assembly 106 and with the water spout assembly 104. The flow control valve 918 is configured to be selectively fluidly turned ON and OFF in response to the movement (vertical movement) of the first elongated portion 112 along the linear direction 922. This is done in such a way that water may flow from the pump assembly 904 to the water spout assembly 104 via the water pipe assembly 106. Preferably, the flow control valve 918 is fluidly connected (preferably, in line) with an extension water line 911. The extension water line 911 is fluidly connected to the fluid connection 914 (also called a T-connection device). The pitless adapter 902 is fluidly connected to the fluid connection 914. The extension water line 916 (a vertically extending water line) is fluidly connected to the fluid connection 914. The extension water line 916 is fluidly connected to the pump assembly 904 (which is positioned below the pitless adapter 902).

The second portion 114 and the first elongated portion 112 are configured to be slidably engaged with each other along the linear direction 922. The first elongated portion 112 and the second portion 114 are configured to be fixedly connected together (once the vertical height between the flow control handle 118 and the flow control valve 918 is determined for a particular installation). More specifically, once the vertical height (vertical distance) between the flow control handle 118 and the flow control valve 918 is measured (determined) in situ (on site) for a particular installation, the first elongated portion 112 and the second portion 114 are configured to be fixedly connected together. The second portion 114 is fixedly connected to the flow control handle 118. Preferably, the end section of the second portion 114 is securely connected to the end section of the first elongated portion 112 (once the vertical height between the flow control handle 118 and the flow control valve 918 is measured in situ). The end section of the first elongated portion 112, in use, makes operative contact with the flow control valve 918 (once the overall vertical length or vertical height of the first elongated portion 112 and the second portion 114 is determined and fixed according to site conditions for installation of the hydrant assembly 102).

The flow control handle 118 is configured to be rotated (either directly or indirectly) along the rotation direction 920 (preferably, clockwise) and translated (linearly moved) along the linear direction 922 (preferably, vertically downward and away from the lid assembly 111), while the flow control handle 118 is operatively supported (held) in position by the lid assembly 111 relative to the elongated cylindrical-shaped housing 109.

Preferably, the flow control handle 118 is configured to be manually rotated (clockwise) by the user once the user connects the tool 919 to the flow control handle 118, and the user rotates the tool 919 (along a clockwise direction) to thereby rotate the flow control handle 118. This is done in such a way that the first elongated portion 112 and the second portion 114 are rotated along the rotation direction 920 (such as, clockwise), and are linearly moved along the linear direction 922 (moved vertically downwardly) away from the lid assembly 111. This operation is performed to OPEN the flow control valve 918 to thereby allow fluid communication between the water spout assembly 104 and the water pipe assembly 106 with the pump assembly 904.

The flow control handle 118 is configured to be rotated along the rotation direction 920 (preferably, counterclockwise) and linearly moved along the linear direction 922 (preferably, upwardly toward the lid assembly 111). This is done in such a way that the first elongated portion 112 and the second portion 114 are rotated counterclockwise and are translated linearly upward and toward the lid assembly 111. This operation is performed to CLOSE the flow control valve 918 to thereby prevent fluid communication between the water spout assembly 104 and the water pipe assembly 106 with the pump assembly 904.

In accordance with a preferred embodiment, the flow control valve 918 includes a drain device configured to drain water contained in the water pipe assembly 106 into the interior of the well casing 900 (for the case where it is required to winterize the hydrant assembly 102) once the flow control handle 118, in use, fluidly closes the flow control valve 918.

Figure 5:
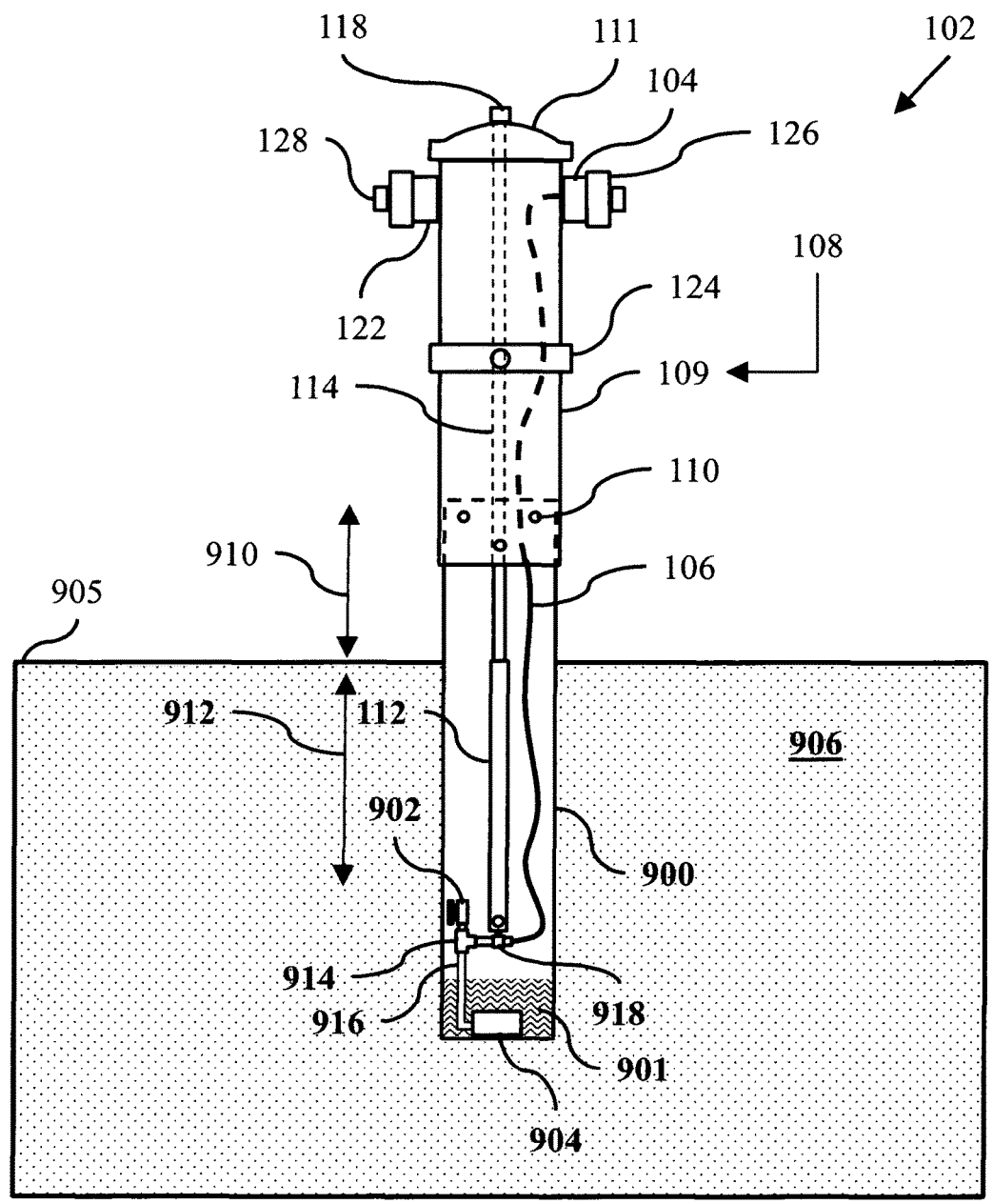
FIG. 5 (SHEET 5 OF 9 SHEETS) depicts a side view of the first embodiment of the hydrant assembly 102 of FIG. 2, in which the hydrant assembly 102 is installed at a first installation site.

FIG. 5 depicts a side view of the first embodiment of the hydrant assembly 102 of FIG. 2, in which the hydrant assembly 102 is installed at a first installation site.

Figure 6:
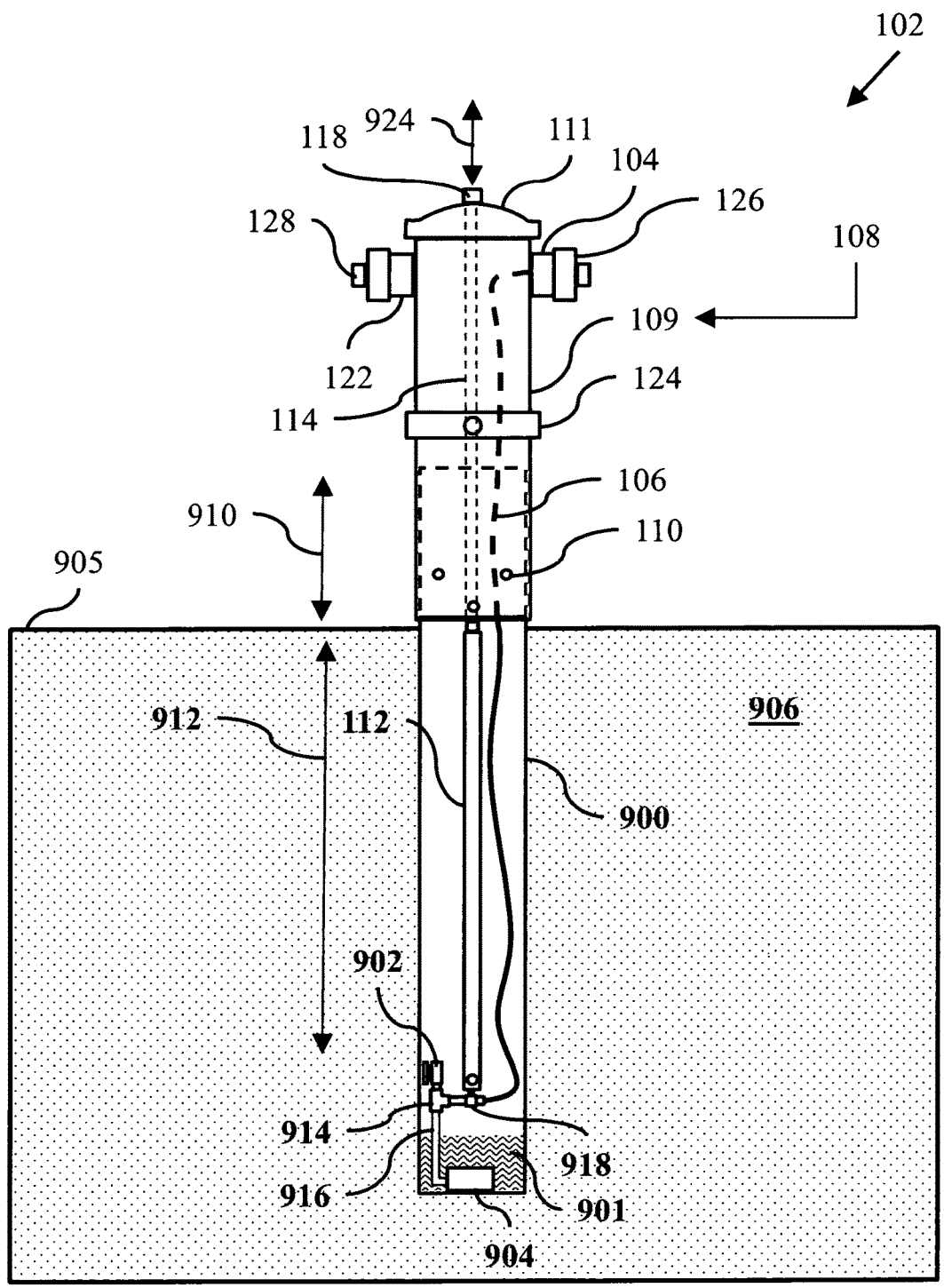
FIG. 6 (SHEET 6 OF 9 SHEETS) depicts a side view of the first embodiment of the hydrant assembly 102 of FIG. 2, in which the hydrant assembly 102 is installed at a second installation site.

In accordance with the embodiment as depicted in FIG. 5, the hydrant assembly 102 is installed for a first installation site. For the first installation site, the pitless adapter 902 is positioned relatively closer to the surface 905 of the ground 906 (relative to the embodiment as depicted in FIG. 6) because of site specific conditions associated with the first installation site of FIG. 5. Once the hydrant assembly 102 is installed in the first installation site (as depicted in FIG. 5), the hydrant assembly 102, in use, remains in a fixed position relative to the surface 905 of the ground 906 (and, preferably, is the same as the vertical height above the surface 905 of the ground 906 as used in the second installation site as depicted in FIG. 6). The fixed height 910 (fixed position) is a fixed distance between the top of the well casing 900 and the surface 905 of the ground 906 (preferably, the fixed height 910 is not an installation-dependent variable). The top of the well casing 900 is installed at, for instance, 18 inches above the surface 905 of the ground 906, in accordance with local construction regulations. For the embodiment as depicted in FIG. 5, the pitless adapter 902 is installed closer to the surface 905 of the ground 906 for the first installation site in comparison to the embodiment as depicted in FIG. 6, in which the pitless adapter 902 is installed vertically deeper (as may be required by specific site conditions). The variable depth 912 is the depth of the pitless adapter 902 below the surface 905 of the ground 906 (preferably, the variable depth 912 is an installation-dependent variable). Once the variable depth 912 for the first installation site is determined (measured), the overall vertical length or vertical height of the first elongated portion 112 and the second portion 114 is established to be the variable depth 912 (for the first installation site), and the first elongated portion 112 is affixed to the second portion 114 at the correct vertical length for the first installation site.

FIG. 6 depicts a side view of the first embodiment of the hydrant assembly 102 of FIG. 2, in which the hydrant assembly 102 is installed at a second installation site.

In accordance with the embodiment as depicted in FIG. 6, the hydrant assembly 102 is installed for a second installation site. For the second installation site, the pitless adapter 902 is positioned relatively further away from the surface 905 of the ground 906 (relative to the embodiment as depicted in FIG. 5) because of site specific conditions associated with the first installation site of FIG. 6. Once the hydrant assembly 102 is installed in the second installation site (as depicted in FIG. 6), the hydrant assembly 102, in use, remains in a fixed position relative to the surface 905 of the ground 906 (and, preferably, is the same as the vertical height above the surface 905 of the ground 906 as used in the first installation site as depicted in FIG. 5). The fixed height 910 is a fixed distance between the top of the well casing 900 and the surface 905 of the ground 906 (preferably, the fixed height 910 is not an installation-dependent variable). The top of the well casing 900 is installed at, for instance, 18 inches above the surface 905 of the ground 906, in accordance with local construction regulations. For the embodiment as depicted FIG. 6, the pitless adapter 902 is installed vertically deeper for the second installation site in comparison to the embodiment as depicted in FIG. 5 (in which the pitless adapter 902 is installed closer to the surface 905 of the ground 906 for the first installation site, as may be required by site specific conditions). The variable depth 912 is the depth of the pitless adapter 902 below the surface 905 of the ground 906 (preferably, the variable depth 912 is an installation-dependent variable). Once the variable depth 912 for the second installation site is determined (measured), the overall vertical length or vertical height of the first elongated portion 112 and the second portion 114 is established to be the variable depth 912 (for the second installation site), and the first elongated portion 112 is affixed to the second portion 114 at the correct vertical height (length) for the second installation site. It will be appreciated that the overall vertical length (vertical height) of the first elongated portion 112 and the second portion 114 for the second installation site is longer than the overall vertical length of the first elongated portion 112 and the second portion 114 for the first installation site.

The reason for why the pitless adapter 902 as depicted in FIG. 5 is positioned closer to the surface 905 of the ground 906 (in comparison to the pitless adapter 902 as depicted in FIG. 6, which is positioned further away from the surface 905 of the ground 906) is that the frost line for the embodiment as depicted in FIG. 5 is closer to the surface 905 of the ground 906. The variable depth 912 represents the frost line for a particular installation. The hydrant assembly 102 (as depicted in FIG. 6) is lowered by a height difference 924 when compared to the hydrant assembly 102 (as depicted in FIG. 5). The height difference 924 is a result of the pitless adapter 902 being positioned relatively lower down in the well casing 900 (when compared to the embodiment as depicted in FIG. 5). Generally, the pitless adapter 902 is positioned relative to the surface 905 of the ground 906 depending on the level of the frost line relative to the surface 905 of the ground 906.

Figure 7:
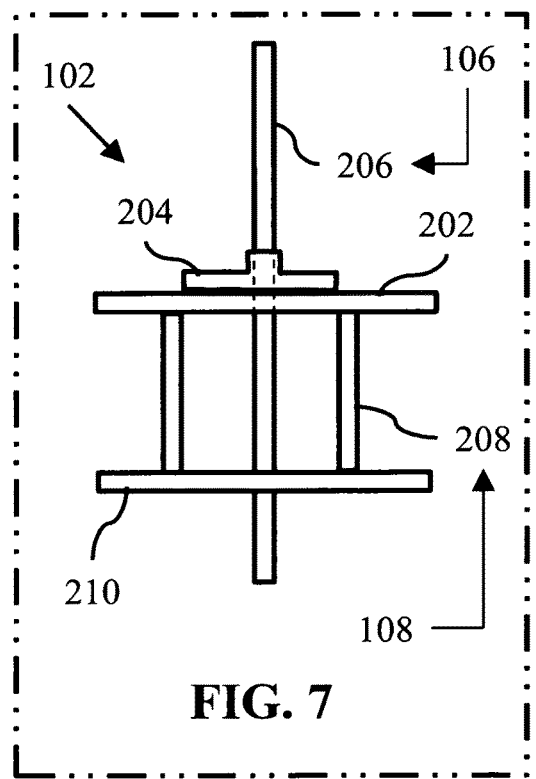
FIG. 7 (SHEET 7 OF 9 SHEETS) depicts a side view of a second embodiment of the hydrant assembly 102 of FIG. 2.

FIG. 7 depicts a side view of a second embodiment of the hydrant assembly 102 of FIG. 2.

Figure 8:
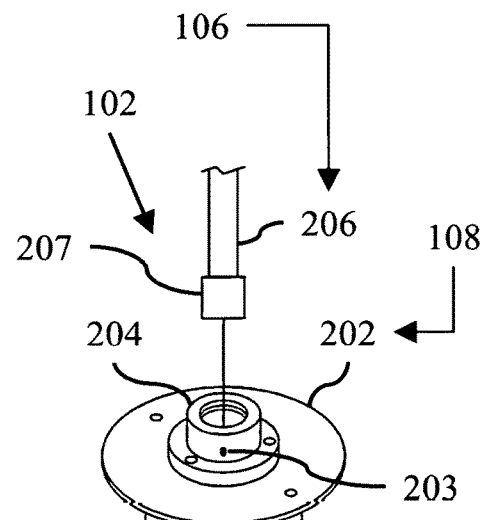
FIG. 8 (SHEET 7 OF 9 SHEETS) depicts a side view of the second embodiment of the hydrant assembly 102 of FIG. 2, in which the hydrant assembly 102 is partially installed.
Figure 8:
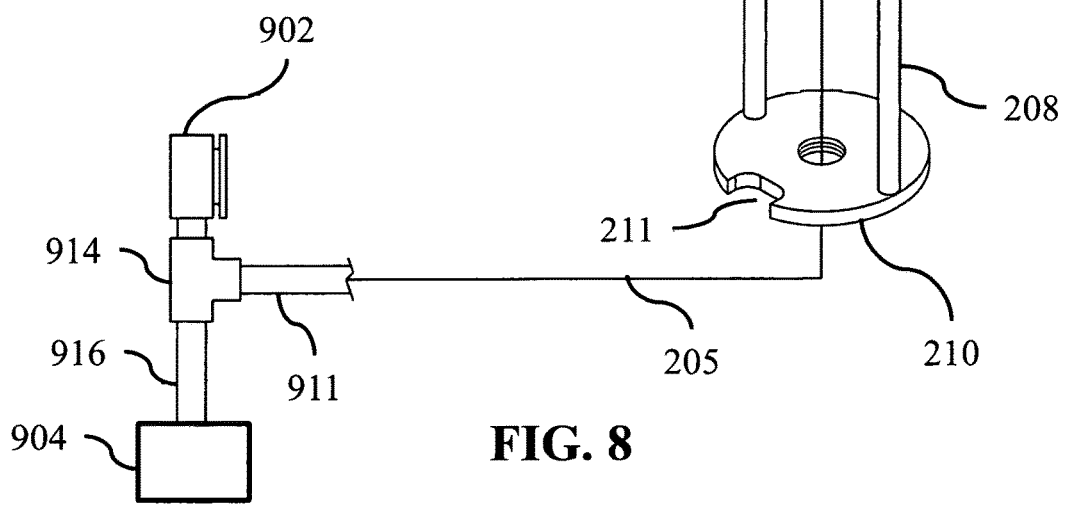

FIG. 8 depicts a side view of the second embodiment of the hydrant assembly 102 of FIG. 2, in which the hydrant assembly 102 is partially installed.

In accordance with the embodiments as depicted in FIG. 7 and FIG. 8, the water pipe assembly 106 includes an elongated rigid pipe 206. The water pipe assembly 106 further includes a flexible pipe assembly 205. The flexible pipe assembly 205 and the elongated rigid pipe 206 are configured to be fluidly coupled (either directly or indirectly) to each other. The flexible pipe assembly 205 is configured to be fluidly connected (either directly or indirectly) to the pitless adapter 902 and the pump assembly 904.

In accordance with the embodiments as depicted in FIG. 7 and FIG. 8, a bleed valve 207 is configured to be positioned at a distal end of the elongated rigid pipe 206. The bleed valve 207 is also configured to be fluidly connected to the elongated rigid pipe 206. Preferably, the bleed valve 207 is also configured to be fluidly connected to the flexible pipe assembly 205 (in such a way that the elongated rigid pipe 206 and the flexible pipe assembly 205 are fluidly coupled to each other). More preferably, the bleed valve 207 is configured to be fluidly connected to the flexible pipe assembly 205 and the elongated rigid pipe 206. The bleed valve 207 is also configured to bleed and drain potable water from the elongated rigid pipe 206.

In accordance with the embodiments as depicted in FIG. 7 and FIG. 8, the pipe-support assembly 108 further includes a well cap assembly 202. The well cap assembly 202 is configured to be coupled (connected, either directly or indirectly) to the exposed end section of the well casing 900 (as depicted in FIG. 9 and FIG. 10). Preferably, the well cap assembly 202 is configured to form, at least in part, a disk-shaped body. The well cap assembly 202 defines a passageway extending between opposite sides thereof.

In accordance with the embodiments as depicted in FIG. 7 and FIG. 8, the pipe-support assembly 108 further includes a collar assembly 204 configured to extend from a central zone of the well cap assembly 202. The collar assembly 204 is configured to slidably receive a length of the elongated rigid pipe 206. More preferably, the collar assembly 204 is configured to slidably receive a length of the elongated rigid pipe 206 and the bleed valve 207. More specifically, the collar assembly 204 defines a channel extending between the opposite sides thereof. The channel of the collar assembly 204 and the passageway of the well cap assembly 202 are configured to be coaxially aligned with each other. This is done in such a way that the elongated rigid pipe 206 is slide receivable within the channel of the collar assembly 204, and within the passageway of the elongated rigid pipe 206 (along a vertical direction relative to the horizontal direction). More preferably, this is done in such a way that the elongated rigid pipe 206 and the bleed valve 207 are slide receivable within the channel of the collar assembly 204, and within the passageway of the elongated rigid pipe 206 (along a vertical direction relative to the horizontal direction). A pipe connector 203 is configured to affix the elongated rigid pipe 206 to the collar assembly 204 (more preferably, the pipe connector 203 is configured to affix the elongated rigid pipe 206 to the outer sidewall of the collar assembly 204).

In accordance with the embodiments as depicted in FIG. 7 and FIG. 8, the pipe-support assembly 108 further includes a extension assembly 208. The extension assembly 208 may be called a stabilizer bar assembly. The extension assembly 208 is configured to fixedly extend (preferably, extend downwardly) from the collar assembly 204 into the interior of the well casing 900 (once the collar assembly 204 is coupled to the exposed distal end section of the well casing 900, as depicted in FIG. 9 and FIG. 10). Preferably, the extension assembly 208 includes a pair of spaced-apart spacer members.

In accordance with the embodiments as depicted in FIG. 7 and FIG. 8, the pipe-support assembly 108 further includes a spacer assembly 210 (also called a spacing disk) is configured to be operatively received in the well casing 900 (as depicted in FIG. 9 and FIG. 10). The spacer assembly 210 is configured to be securely affixed to the extension assembly 208. Preferably, the spacer assembly 210 is configured to sidably contact the well casing 900 (as depicted in FIG. 9 and FIG. 10) once the spacer assembly 210 is received by the well casing 900.

The spacer assembly 210 is configured to fixedly attach to the extension assembly 208 in such a way that the spacer assembly 210 is spaced apart from the well cap assembly 202. The spacer assembly 210 defines a void extending through the opposite sides of the spacer assembly 210. Preferably, the central zone of the spacer assembly 210 defines a void extending through the opposite sides of the spacer assembly 210. The elongated rigid pipe 206 is configured to be slide receivable in the void provided by the spacer assembly 210. The spacer assembly 210 is also configured to slide receive the elongated rigid pipe 206. The spacer assembly 210 defines a notch 211 formed on a peripheral edge of the spacer assembly 210. The notch 211 is configured to permit a power line to be connected to the pump assembly 904 to be installed at the bottom section of the well casing 900 (as depicted in FIG. 9).

FIG. 9 depicts a side view of the second embodiment of the hydrant assembly 102 of FIG. 2, in which the hydrant assembly 102 is installed at a third installation site.

In accordance with the embodiment as depicted in FIG. 9, the hydrant assembly 102 operates much the same as the embodiment depicted in FIG. 5. It will be appreciated that the water spout assembly 104 is configured to be fluidly connected to a distal end portion of the elongated rigid pipe 206 that extends above the surface 905 of the ground 906. For the third installation site, the pitless adapter 902 is positioned relatively closer to the surface 905 of the ground 906 (relative to the embodiment as depicted in FIG. 10) because of site specific conditions associated with the third installation site of FIG. 9. Once the hydrant assembly 102 is installed in the third installation site (as depicted in FIG. 9), the hydrant assembly 102, in use, remains in a fixed position relative to the surface 905 of the ground 906 (and, preferably, is the same as the vertical height above the surface 905 of the ground 906 as used in the fourth installation site as depicted in FIG. 10). The fixed height 910 (fixed position) is a fixed distance between the top of the well casing 900 and the surface 905 of the ground 906 (preferably, the fixed height 910 is not an installation-dependent variable). The top of the well casing 900 is installed at, for instance, 18 inches above the surface 905 of the ground 906, in accordance with local construction regulations. For the embodiment as depicted in FIG. 9, the pitless adapter 902 is installed closer to the surface 905 of the ground 906 for the third installation site in comparison to the embodiment as depicted in FIG. 10, in which the pitless adapter 902 is installed vertically deeper (as may be required by specific site conditions). The variable depth 912 is the depth of the pitless adapter 902 below the surface 905 of the ground 906 (preferably, the variable depth 912 is an installation-dependent variable). Once the variable depth 912 for the third installation site is determined (measured), the overall vertical length of the first elongated portion 112 and the second portion 114 is established to be the variable depth 912 (for the third installation site), and the first elongated portion 112 is affixed to the second portion 114 at the correct vertical length for the third installation site.

FIG. 10 depicts a side view of the second embodiment of the hydrant assembly 102 of FIG. 2, in which the hydrant assembly 102 is installed at a fourth installation site.

In accordance with the embodiment as depicted in FIG. 10, the hydrant assembly 102 operates much the same as the embodiment depicted in FIG. 6. For the fourth installation site, the pitless adapter 902 is positioned relatively further away from the surface 905 of the ground 906 (relative to the embodiment as depicted in FIG. 9) because of site specific conditions associated with the fourth installation site of FIG. 10. Once the hydrant assembly 102 is installed in the fourth installation site (as depicted in FIG. 10), the hydrant assembly 102, in use, remains in a fixed position relative to the surface 905 of the ground 906 (and, preferably, is the same as the vertical height above the surface 905 of the ground 906 as used in the third installation site as depicted in FIG. 9). The fixed height 910 is a fixed distance between the top of the well casing 900 and the surface 905 of the ground 906 (preferably, the fixed height 910 is not an installation-dependent variable). The top of the well casing 900 is installed at, for instance, 18 inches above the surface 905 of the ground 906, in accordance with local construction regulations. For the embodiment as depicted FIG. 10, the pitless adapter 902 is installed vertically deeper for the fourth installation site in comparison to the embodiment as depicted in FIG. 9 (in which the pitless adapter 902 is installed closer to the surface 905 of the ground 906 for the third installation site, as may be required by site specific conditions). The variable depth 912 is the depth of the pitless adapter 902 below the surface 905 of the ground 906 (preferably, the variable depth 912 is an installation-dependent variable). Once the variable depth 912 for the fourth installation site is determined (measured), the overall vertical length (vertical height) of the first elongated portion 112 and the second portion 114 is established to be the variable depth 912 (for the fourth installation site), and then the first elongated portion 112 is affixed to the second portion 114 at the correct vertical height (length) for the fourth installation site. It will be appreciated that the overall vertical length (overall vertical height) of the first elongated portion 112 and the second portion 114 for the fourth installation site is longer than the overall vertical length of the first elongated portion 112 and the second portion 114 for the third installation site.

It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the nonlimiting embodiments (examples). The description is made for particular nonlimiting embodiments (examples). It is understood that the nonlimiting embodiments are merely illustrative as examples.

What is claimed is:

1. An apparatus, comprising:
a hydrant assembly (102) configured for use with a well casing (900), a pitless adapter (902), and a pump assembly (904), in which the well casing (900) is configured to be positioned in, at least in part, and extend into, at least in part, the ground (906) in such a way that the well casing (900) extends from above the ground (906) to below the ground (906) and terminates at a water supply (901) positioned in the well casing (900), and in which the pitless adapter (902) is positioned inside the well casing (900) and below the ground (906), and in which the pump assembly (904) is positioned inside the well casing (900), and is also positioned below the pitless adapter (902), and is also positioned relative to the water supply (901); and
the hydrant assembly (102) including:
a water spout assembly (104) configured to be positioned above the ground (906) and also above the well casing (900); and
a water pipe assembly (106) configured to be in fluid communication with the pitless adapter (902), the pump assembly (904) and the water spout assembly (104) in such a way that water flows from the pump assembly (904), past the pitless adapter (902) and toward the water spout assembly (104) once the pump assembly (904) is activated; and
a pipe-support assembly (108) configured to be positioned relative to the well casing (900), the pitless adapter (902) and the pump assembly (904); and
the pipe-support assembly (108) also configured to selectively spatially position and support, at least in part, the water pipe assembly (106) relative to the well casing (900), the pitless adapter (902) and the pump assembly (904) in such a way that the pipe-support assembly (108), in use, provides selective spatial positioning of the water pipe assembly (106) relative to site-installation conditions associated with the well casing (900), the pitless adapter (902) and the pump assembly (904), which are installed relative to the surface (905) of the ground (906);
wherein the hydrant assembly (102) further comprises a connector assembly (110) being configured to selectively securely connect the pipe-support assembly (108) to an exposed end section of the well casing (900), in which the exposed end section extends above the ground (906).

2. An apparatus, comprising:
a hydrant assembly (102) configured for use with a well casing (900), a pitless adapter (902), and a pump assembly (904), in which the well casing (900) is configured to be positioned in, at least in part, and extend into, at least in part, the ground (906) in such a way that the well casing (900) extends from above the ground (906) to below the ground (906) and terminates at a water supply (901) positioned in the well casing (900), and in which the pitless adapter (902) is positioned inside the well casing (900) and below the ground (906), and in which the pump assembly (904) is positioned inside the well casing (900), and is also positioned below the pitless adapter (902), and is also positioned relative to the water supply (901); and
the hydrant assembly (102) including:
a water spout assembly (104) configured to be positioned above the ground (906) and also above the well casing (900); and
a water pipe assembly (106) configured to be in fluid communication with the pitless adapter (902), the pump assembly (904) and the water spout assembly (104) in such a way that water flows from the pump assembly (904), past the pitless adapter (902) and toward the water spout assembly (104) once the pump assembly (904) is activated; and
a pipe-support assembly (108) configured to be positioned relative to the well casing (900), the pitless adapter (902) and the pump assembly (904); and
the pipe-support assembly (108) also configured to selectively spatially position and support, at least in part, the water pipe assembly (106) relative to the well casing (900), the pitless adapter (902) and the pump assembly (904) in such a way that the pipe-support assembly (108), in use, provides selective spatial positioning of the water pipe assembly (106) relative to site-installation conditions associated with the well casing (900), the pitless adapter (902) and the pump assembly (904), which are installed relative to the surface (905) of the ground (906);
wherein the pipe-support assembly (108) includes:
an elongated cylindrical-shaped housing (109) providing a peripheral outer surface; and
a lid assembly (111) configured to be securely selectively coupled to a distal section of the elongated cylindrical-shaped housing (109).

3. The apparatus of claim 2, wherein:
the pipe-support assembly (108) is configured to securely support the water spout assembly (104) on the peripheral outer surface of the elongated cylindrical-shaped housing (109) in such a way that the pipe-support assembly (108), in use, securely supports the water spout assembly (104) at a location that is proximate to the lid assembly (111) once the lid assembly (111) is securely connected to a top section of the elongated cylindrical-shaped housing (109).

4. The apparatus of claim 2, further comprising:
a flow control handle (118) configured to be operatively mounted to the lid assembly (111) in such a way that the flow control handle (118) is operatively supported by the lid assembly (111) and the flow control handle (118) is rotatable and is linearly translatable; and the lid assembly (111) is configured to permit the flow control handle (118) to be rotated about a vertically-aligned elongated axis that extends through the flow control handle (118) along a vertical direction through the elongated cylindrical-shaped housing (109); and
the lid assembly (111) is also configured to permit the flow control handle (118) to be linearly translated along the vertical direction in response to rotation of the flow control handle (118).

5. The apparatus of claim 4, further comprising:
a handle retainer (120) configured to operatively retain the flow control handle (118) to the lid assembly (111); and
the handle retainer (120) also configured to permit the flow control handle (118) to be rotated about a vertically-aligned axis that extends through the flow control handle (118) along the vertical direction through the elongated cylindrical-shaped housing (109); and
the handle retainer (120) also configured to permit the flow control handle (118) to be linearly translated along the vertical direction in response to rotation of the flow control handle (118); and
wherein the handle retainer (120) and the flow control handle (118) are interfaced to each other; and
the handle retainer (120) is configured to be affixed to an interior section of the lid assembly (111).

6. The apparatus of claim 4, wherein:
the flow control handle (118) includes:
a first elongated portion (112); and
a second portion (114) configured to be affixed to the flow control handle (118); and
the first elongated portion (112) is configured to be selectively connectable to, and disconnectable from, the second portion (114) once an overall length of the first elongated portion (112) and the second portion (114) is determined.

7. The apparatus of claim 6, wherein:
the first elongated portion (112) is configured to slidably interact with the second portion (114); and
the first elongated portion (112) and the second portion (114) are coaxially aligned with each other, and are also coaxially movable relative to each other.

8. The apparatus of claim 6, wherein:
the second portion (114) also configured to extend from the flow control handle (118); and
the first elongated portion (112) is configured to be selectively connectable to, and disconnectable from, the second portion (114) once the overall length of the first elongated portion (112) and the second portion (114) is determined.

9. The apparatus of claim 6, wherein:
the flow control handle (118) is configured to be rotated along a vertically-aligned longitudinal axis extending through the first elongated portion (112) and the second portion (114) once the first elongated portion (112) and the second portion (114) are coaxially aligned with each other.

10. The apparatus of claim 6, wherein:
the flow control handle (118) is configured to be selectively linearly translated upwardly and downwardly along a vertically-aligned longitudinal axis extending through the flow control handle (118) once the flow control handle (118) is selectively rotated.

11. The apparatus of claim 6, wherein:
the pitless adapter (902) is positioned relatively closer to the surface (905) of the ground (906) because of site specific conditions associated with an installation site; and
the hydrant assembly (102), in use, remains in a fixed position relative to the surface (905) of the ground (906) once the hydrant assembly (102) is installed in the installation site, in which a variable depth 912 is a depth of the pitless adapter (902) below the surface (905) of the ground (906), and the variable depth 912 is an installation-dependent variable; and
the first elongated portion (112) is configured to be affixed to the second portion (114) at a vertical length for the installation site once the overall length of the first elongated portion (112) and the second portion (114) is established to be the variable depth 912 for the installation site for the hydrant assembly (102).

12. The apparatus of claim 6, wherein:
the first elongated portion (112) includes:
a mount assembly (116) configured to contact a flow control valve (918) that is positioned in the interior of the well casing (900); and
the flow control valve (918) is configured to fluidly connect with the water pipe assembly (106) and with the water spout assembly (104); and
the flow control valve (918) is configured to be selectively fluidly turned ON and OFF in response to movement of the first elongated portion (112) along a linear direction (922) in such a way that water, in use, flows from the pump assembly (904) to the water spout assembly (104) via the water pipe assembly (106).

13. The apparatus of claim 12, wherein:
the flow control valve (918) is configured to be in fluid communication with an extension water line (911) that is fluidly connected to a fluid connection (914); and
the pitless adapter (902) is fluidly connected to the fluid connection (914); and
the extension water line (916) is fluidly connected to the fluid connection (914); and
the extension water line (916) is fluidly connected to the pump assembly (904), in which the pump assembly (904) is configured to be positioned below the pitless adapter (902).

14. The apparatus of claim 12, wherein:
the second portion (114) and the first elongated portion (112) are configured to be slidably engaged with each other along the linear direction (922); and
the first elongated portion (112) and the second portion (114) are configured to be fixedly connected together once a vertical height between the flow control handle (118) and the flow control valve (918) is determined for a particular installation; and
the second portion (114) is fixedly connected to the flow control handle (118); and
an end section of the second portion (114) is securely connected to an end section of the first elongated portion (112) once the vertical height between the flow control handle (118) and the flow control valve (918) is determined; and
the end section of the first elongated portion (112), in use, makes operative contact with the flow control valve (918) once an overall vertical length of the first elongated portion (112) and the second portion (114) is determined and fixed according to site conditions for installation of the hydrant assembly (102).

15. An apparatus; comprising:
a hydrant assembly (102) configured for use with a well casing (900), a pitless adapter (902), and a pump assembly (904), in which the well casing (900) is configured to be positioned in, at least in part, and extend into, at least in part, the ground (906) in such a way that the well casing (900) extends from above the ground (906) to below the ground (906) and terminates at a water supply (901) positioned in the well casing (900), and in which the pitless adapter (902) is positioned inside the well casing (900) and below the ground (906), and in which the pump assembly (904) is positioned inside the well casing (900), and is also positioned below the pitless adapter (902), and is also positioned relative to the water supply (901); and the hydrant assembly (102) including:
- a water spout assembly (104) configured to be positioned above the ground (906) and also above the well casing (900); and
- a water pipe assembly (106) configured to be in fluid communication with the pitless adapter (902), the pump assembly (904) and the water spout assembly (104) in such a way that water flows from the pump assembly (904), past the pitless adapter (902) and toward the water spout assembly (104) once the pump assembly (904) is activated; and
- a pipe-support assembly (108) configured to be positioned relative to the well casing (900), the pitless adapter (902) and the pump assembly (904); and
- the pipe-support assembly (108) also configured to selectively spatially position and support, at least in part, the water pipe assembly (106) relative to the well casing (900), the pitless adapter (902) and the pump assembly (904) in such a way that the pipe-support assembly (108), in use, provides selective spatial positioning of the water pipe assembly (106) relative to site-installation conditions associated with the well casing (900), the pitless adapter (902) and the pump assembly (904), which are installed relative to the surface (905) of the ground (906);

wherein the water pipe assembly (106) includes:
- an elongated rigid pipe (206); and
- a flexible pipe assembly (205); and
- a bleed valve (207); and wherein:
- the flexible pipe assembly (205) and the elongated rigid pipe (206) are configured to be fluidly coupled to each other; and
- the flexible pipe assembly (205) is configured to be fluidly connected to the pitless adapter (902) and the pump assembly (904); and
- the bleed valve (207) is configured to be fluidly connected to the flexible pipe assembly (205) and the elongated rigid pipe (206); and
- the bleed valve (207) is also configured to bleed and drain potable water from the elongated rigid pipe (206).

16. The apparatus of claim 15, wherein:
the pipe-support assembly (108) further includes:
- a well cap assembly (202) configured to couple to an exposed end section of the well casing (900); and
- the well cap assembly (202) defining a passageway extending between opposite sides thereof.

17. The apparatus of claim 16, wherein:
the pipe-support assembly (108) further includes:
- a collar assembly (204) configured to extend from a central zone of the well cap assembly (202); and
- the collar assembly (204) also configured to slidably receive a length of the elongated rigid pipe (206); and
- a pipe connector (203) configured to affix the elongated rigid pipe (206) to the collar assembly (204); and
- wherein the well cap assembly (202) and the collar assembly (204) are each configured to slide receive the elongated rigid pipe (206) along a vertical direction relative to a horizontal direction.

18. The apparatus of claim 17, wherein:
the pipe-support assembly (108) further includes:
- a extension assembly (208) configured to fixedly extend from the collar assembly (204) into the interior of the well casing (900) once the collar assembly (204) is coupled to an exposed distal end section of the well casing (900); and
- a spacer assembly (210) configured to be securely affixed to the extension assembly (208) in such a way that the spacer assembly (210) is spaced apart from the well cap assembly (202); and
- the spacer assembly (210) also configured to be operatively received in the well casing (900); and
- the spacer assembly (210) also configured to slide receive the elongated rigid pipe (206).

\* \* \* \* \*